United States Patent [19]
Speer et al.

[11] Patent Number: 5,043,016
[45] Date of Patent: Aug. 27, 1991

[54] BROWN TO GRAY INCLUSION PIGMENTS AND METHOD OF THEIR PRODUCTION

[75] Inventors: Dietrich Speer, Hanau; Akos Kiss, Alzenau-Wasserlos; Peter Kleinschmit, Hanau, all of Fed. Rep. of Germany

[73] Assignee: Degussa Aktiengesellschaft, Frankfurt am Main, Fed. Rep. of Germany

[21] Appl. No.: 634,487

[22] Filed: Dec. 27, 1990

[30] Foreign Application Priority Data

Jan. 30, 1990 [DE] Fed. Rep. of Germany ....... 4002564

[51] Int. Cl.$^5$ .............................................. C08K 3/10
[52] U.S. Cl. ..................................... 106/450; 106/457
[58] Field of Search ................................. 106/450, 457

[56] References Cited

U.S. PATENT DOCUMENTS

| | | | |
|---|---|---|---|
| 2,273,872 | 2/1942 | Kinzie | 106/450 |
| 4,874,433 | 10/1989 | Kiss et al. | 106/450 |
| 4,894,092 | 1/1990 | Nishihara et al. | 106/450 |

FOREIGN PATENT DOCUMENTS

| | | |
|---|---|---|
| 2312535 | 5/1972 | Fed. Rep. of Germany . |
| 3906819A1 | 9/1990 | Fed. Rep. of Germany . |

*Primary Examiner*—Mark L. Bell
*Assistant Examiner*—Deborah Jones
*Attorney, Agent, or Firm*—Beveridge, DeGrandi & Weilacher

[57] ABSTRACT

The invention relates to new brown to gray inclusion pigments, based on zirconium silicate as casing substance, which are characterized in that they contain mixed crystals of the type $(Fe_{1-x}Mn_x)_2O_3$, in which x stands for a number in the range from 0.05 to 0.60, as colored compounds. The production takes place by means of annealing a mixture of $SiO_2$ and $ZrO_2$, or of precursors, in the presence of iron compounds and manganese compounds, in an Fe/Mn atomic ratio of 90:10 to 20:80, and mineralizers at 750° to 1200° C. The brown pigments are formed especially at temperatures of 850° to 1000° C. and if x is between 0.05 and 0.20. The gray pigments are formed especially at 1050° to 1200° C. and if x is 0.30 to 0.60.

28 Claims, No Drawings

BROWN TO GRAY INCLUSION PIGMENTS AND METHOD OF THEIR PRODUCTION

INTRODUCTION OF THE INVENTION

The present invention relates to brown to gray inclusion pigments based on zirconium silicate as casing substance and $(Fe, Mn)_2O_3$ mixed crystals as discretely included colored compounds. The present invention also relates to a method for the production of brown to gray inclusion pigments.

Inclusion pigments based on zirconium silicate as casing substance and in which inorganic colored compounds are included as discrete phase were described for the first time in DE-OS 23 12 535. Such inclusion pigments are distinguished by their temperature and glaze stability, for which reason they are especially suitable for coloring ceramic materials. Cadmium yellow and cadmium red, thenard blue and titanium yellow are disclosed as colored, included compounds. Zirconium iron rose, with inclusions of $Fe_2O_3$ in a casing of zirconium silicate, is also known. Without the protective casing, the color-imparting compounds themselves lack or have an insufficient extent of glaze stability, that is, they are dissolved by the glass flux and thus lose their pigment properties.

The production of $ZrSiO_4$ inclusion pigments takes place by means of annealing a mixture of silicon dioxide and zirconium dioxide, or optionally initial products which form $SiO_2$ and $ZrO_2$, together with the colored substance to be included or with its initial products and mineralizers at 750° to 1400° C. but usually at 800° to 1200° C. To the extent necessary, a wet treatment follows the annealing process in order to remove non-included components in as far as they are problematic in usage.

It turned out that not all conceivable colored compounds can be included with the method discussed above during the formation process of the zirconium silicate casing by the latter in an amount sufficient for pigment purposes. The color-imparting components, or initial compounds thereof, can delay or even prevent the formation of $ZrSiO_4$ from $SiO_2$ and $ZrO_2$ or the colored compounds are not encased at all and the sought-after pigment properties are thus not achieved.

German application P 39 06 819.6 describes grayish black inclusion pigments for the first time in which iron titanates of the formula $FeTiO_3$ are included as colored substance. The annealing of a mixture containing iron- and titanium compounds takes place under reducing conditions. According to German application P 39 06 821.8, the annealing of a similar mixture under oxidizing conditions results in beige-brown inclusion pigments with inclusions of iron titanate of the formula $FeTiO_5$. The production of the above-mentioned grayish brown and beige-brown inclusion pigments required the use of various zirconium dioxide qualities.

The palette of optically pleasing brown to gray $ZrSiO_4$ inclusion pigments is still very limited in spite of the pigments containing iron titanates. It is also of interest to be subject to lesser limitations during production as regards the selection of $ZrO_2$.

SUMMARY OF THE INVENTION

One object of the present invention was to solve the problem of developing brown to gray inclusion pigments, based on zirconium silicate as casing substance, in which colored compounds are included as discrete phase and of developing a method of their production in order to broaden the palette. The method of production, another object of the present invention, should be simple to carry out and not dependent on the selection of special zirconium dioxide qualities in order to obtain brown to gray inclusion pigments with the same color-imparting system.

DETAILED DESCRIPTION OF THE INVENTION

Brown to gray inclusion pigments of the above-mentioned species were found which are characterized in that mixed crystals of the type $(Fe_{1-x}Mn_x)_2O_3$, in which x stands for a number in a range from 0.05 to 0.60, are included as colored compounds in a casing of zirconium silicate.

For the brown pigments, x generally stands for a number in a range of 0.05 to 0.20, preferably 0.10 to 0.15; the gray pigments, in contrast thereto, contain iron-manganese mixed oxides, wherein x is generally in a range between 0.30 and 0.60, especially 0.45 to 0.55. The brown to gray inclusion pigments can contain up to approximately 5% by weight of the colored mixed oxides but in general the content is between 1 and 3% by weight relative to the inclusion pigment.

Thus, pigments with new color locations can be achieved by means of the modification of the $Fe_2O_3$ crystal, which exhibits a corundum structure in the so-called iron-zirconium rose, with manganese. It could not have been foreseen that this modification would result in success because $Mn_2O_3$, in contrast to $Fe_2O_3$, as the sole colored compound is practically not included by a forming casing of zirconium silicate. As reference tests have shown, an orangish-brown color with the color values in the CIE Lab System (cf. DIN 5033, 6164 and 6174) of L approximately 39, a approximately 30 and b approximately 22 is obtained by means of the coloring of a transparent glaze with 5% by weight $Fe_2O_3$-$ZrSiO_4$ inclusion pigments, produced by annealing a mixture of $SiO_2$, $ZrO_2$, $Fe_2O_3$ and mineralizers. Pigments produced in the same manner, in which the mixture to be annealed contained the equivalent amount of $Mn_2O_3$ instead of $Fe_2O_3$, resulted, as a 5 % by weight coloring in the transparent glaze, in a pale gray, poorly covering color with the color values L approximately 82, a approximately 1 and b approximately 8.

The brown to gray inclusion pigments of the present invention can be produced by means of a 0.5 to 8 hour annealing of a mixture of zirconium dioxide and silicon dioxide or precursors of $SiO_2$ and $ZrO_2$ in a molar ratio of essentially 1 to 1 in the presence of color-imparting metal compounds and mineralizers at 750° to 1200° C. if iron compounds and manganese compounds or compounds containing both Fe and also Mn are used as color-imparting compounds. The mixture contains iron and manganese in an atomic ratio of 90:10 to 20:80.

The mixture to be annealed is homogenized before the annealing process by means of a common grinding. The annealing of the homogenized and optionally compressed mixture can take place in customary kilns such as chamber kilns or tunnel kilns. A heating rate of 200° C. per hour proved to be especially advantageous.

The annealing temperature has a strong influence on the obtainable pigment color. It could not have been foreseen that brown pigments are formed at a temperature below 1000° C., preferably between 850° and 1000°

C. and especially around 950° C.; the dwell time at the specified temperature is preferably between 1 and 3 hours, especially around 2 hours. Essentially gray inclusion pigments are produced by means of annealing at a temperature over 1000° C., preferably at 1050° to 1200° C. and especially at approximately 1100° C.; the dwell time of the annealing temperature corresponds approximately to that for the production of brown pigments. The annealing generally takes place under atmospheric conditions. A setting of reducing conditions is not needed.

The composition to be annealed contains iron and manganese, preferably in an atomic ratio of 50:50 to 80:20, if brown pigments are to be produced and 50:50 to 30:70 if gray pigments are to be produced.

Fe (III) compounds forming oxides, especially Fe (III) oxide, are used as iron compounds. $Fe_2O_3$ with D50 values below 5 μm and preferably below 1 μm are especially suitable for use. Manganese oxides such as e.g. $Mn_2O_3$ or $MnO_2$ or compounds forming manganese oxide under the annealing conditions such as e.g. $MnCO_3$ can be used as manganese compounds. It is also possible to use compounds containing Fe and Mn, e.g. mixed oxides or zeolites containing Fe and Mn, e.g. produced from an alkali zeolite and an aqueous solution containing Fe ions and Mn ions, cf. DE-OS 37 19 051, in the production of the inclusion pigments of the invention.

It is advantageous for the use of the brown to gray inclusion pigments for the coloring of ceramic materials such as glazes to grind up the annealed reaction product and to remove non-included metal oxides by means of a posttreatment. An especially suitable posttreatment consists of an acid wash, preferably with hot hydrochloric acid. Without such a posttreatment, boiling-up phenomena can occur during use.

As is already apparent from the cited state of the art, zirconium silicate forms from $SiO_2$ and $ZrO_2$, which are used in a molar ratio of essentially 1 to 1; a slight excess of one reactant is possible; however, an excess of $ZrO_2$ can result in a clouding of a transparent glaze during use. Instead of $ZrO_2$ and $SiO_2$, precursors of these oxides can also be used to the extent that the oxides are present in the annealing mixture prior to the actual forming process of $ZrSiO_4$. For example, zirconyl compounds, e.g. $ZrOCl_2$, may be used as precursors for $ZrO_2$, and zeolites with an Si/Al atomic ratio of greater than 2 to 1, especially greater than 10 to 1, may be used as precursors for $SiO_2$.

The mineralizers customary in the production of $ZrSiO_4$ inclusion pigments can also be used for the production of the pigments of the invention. Alkali- and alkaline-earth halogenides, especially fluorides as well as hexafluorosilicates are especially advantageous.

The following examples further illustrate the invention:

EXAMPLES

Example 1

A batch consisting of 27.0 g zirconium oxide, 10.5 g silicon dioxide, 3.5 g potassium chloride, 2.5 g magnesium fluoride, 1.5 g sodium hexafluorosilicate, 5 g iron (III) oxide and 4.7 g manganese (III) oxide is filled after a 30-minute grinding in a ball mill into a chamotte crucible, manually compressed and then annealed. Heating rate 200° C./h, dwell time 2 h at 950° C. A brown pigment is obtained which is washed out after the grinding with hot, concentrated hydrochloric acid. A 5 g coloring in a lead-poor and borate-poor transparent glaze yields the color values: L=40.6, a=12.0. b=13.1.

Examples 2 to 8

Batches according to example 1 with the iron compounds and manganese compounded indicated in table 1 resulted after annealing and posttreatment according to example 1 in the Lab values indicated in table 1 for the transparent glaze colored with 5% of the inclusion pigments of the invention.

Examples 9-13

Batches according to the examples indicated in table 2 were annealed at 1100° C. The pigments posttreated according to example 1 yield, as 5% coloring in the transparent glaze, the color values indicated in table 2.

Further variations and modifications of the invention will become apparent to those skilled in the art from the foregoing and are intended to be encompassed by the claims appended hereto.

TABLE 1

| Example | Amount $Fe_2O_3$ (g) | Mn compound | Amount Mn comp. (g) | L | a | b |
|---|---|---|---|---|---|---|
| 2 | 5.0 | $Mn_2O_3$ | 2.4 | 45.2 | 13.8 | 16.7 |
| 3 | 5.0 | $Mn_2O_3$ | 1.6 | 47.2 | 14.4 | 17.6 |
| 4 | 3.0 | $Mn_2O_3$ | 2.8 | 42.9 | 14.0 | 15.7 |
| 5 | 2.5 | $Mn_2O_3$ | 5.0 | 56.0 | 9.2 | 15.1 |
| 6 | 2.5 | $MnO_2$ | 5.2 | 38.7 | 7.4 | 12.8 |
| 7 | 2.5 | $MnCO_3$ | 6.9 | 36.7 | 8.8 | 12.2 |
| 8 | 2.5 | $MnO_2$ / $MnCO_3$ | 2.6 / 3.4 | 40.0 | 8.5 | 14.2 |

TABLE 2

| Example No. | Batch according to example No. | L | a | b |
|---|---|---|---|---|
| 9 | 1 | 39.5 | 5.3 | 8.9 |
| 10 | 4 | 48.9 | 6.2 | 11.1 |
| 11 | 6 | 45.3 | 6.2 | 11.9 |
| 12 | 7 | 47.8 | 5.4 | 10.5 |
| 13 | 8 | 43.8 | 6.2 | 11.3 |

What is claimed:

1. A brown-gray inclusion pigment consisting essentially of transparent crystals of zirconium silicate encasing as a discrete phase, colored compounds which are mixed crystals of $(Fe_{1-x}Mn_x)_2O_3$, wherein x ranges from 0.05 to 0.60.

2. The inclusion pigment of claim 1, wherein $(Fe_{1-x}Mn_x)_2O_3$ is present in an amount of up to 5% by weight, relative to the inclusion pigment.

3. The inclusion pigment of claim 2, wherein said inclusion pigment contains 1-3% by weight, relative to the inclusion pigment of $(Fe_{1-x}Mn_x)_2O_3$.

4. The inclusion pigment according to claim 1, wherein x ranges from 0.05 to 0.20 and said pigment is brown.

5. The inclusion pigment according to claim 4, wherein x ranges from 0.10 to 0.15 and said pigment is brown.

6. The inclusion pigment according to claim 1, wherein x ranges from 0.30 to 0.60 and said pigment is gray.

7. The inclusion pigment according to claim 6, wherein x ranges from 0.45 to 0.55 and said pigment is gray.

8. A method of producing inclusion pigments according to claim 1, comprising annealing a mixture of zirconium dioxide and silicon dioxide, or precursors of $SiO_2$ and $ZrO_2$, in a molar ratio of about 1 to 1 in the presence of color-imparting metal compounds and mineralizers at 750° to 1200° C., wherein iron compounds and manganese compounds or compounds containing Fe and Mn are used as color-imparting metal compounds.

9. The method according to claim 8, wherein said annealing lasts for 0.5-8 hours.

10. The method according to claim 8, wherein said iron and manganese compounds, or compounds containing Fe and Mn, are present in an atomic ratio of 90:10 to 20:80.

11. The method according to claim 8, further comprising a heating rate of 200° C. per hour.

12. The method according to claim 8, wherein said iron compounds and manganese compounds are iron oxides and manganese oxides.

13. The method according to claim 12, wherein said magnesium oxide is $Mn_2O_3$, $MnO_2$ or a compound forming manganese oxide under the annealing conditions.

14. The method according to claim 12, wherein said iron oxide is $Fe_2O_3$.

15. The method according to claim 14, wherein said $Fe_2O_3$ has a D50 value below 5 μm.

16. The method according to claim 15, wherein said $Fe_2O_3$ has a D50 value is below 1 μm.

17. The method according to claim 8, wherein said annealing is carried out at 850° to 1000° C. and wherein said pigment is brown.

18. The method according to claim 17, wherein the dwell time at said temperature is 1-3 hours.

19. The method according to claim 17, wherein said annealing is carried out at about 950° C. and wherein said pigment is brown.

20. The method according to claim 8, wherein said mixture contains iron and manganese in an atomic ratio of 50:50 to 80:20 and wherein said pigment is brown.

21. The method according to claim 8, wherein said annealing is carried out at 1050° to 1200° C. and wherein said pigment is gray.

22. The method according to claim 21, wherein the dwell time at said temperature is 1-3 hours.

23. The method according to claim 21, wherein said annealing is carried out at about 1100° C. and wherein said pigment is gray.

24. The method according to claim 8, wherein said mixture contains iron and manganese in an atomic ratio of 50:50 to 30:70 and wherein said pigment is gray.

25. The method according to claim 8, further comprising removing non-included oxides from the product by posttreatment.

26. The method according to claim 25, wherein said posttreatment comprises an acid treatment.

27. The method according to claim 26, wherein said acid treatment comprises using hydrochloric acid.

28. The method according to claim 8, wherein said iron compounds and manganese compounds are zeolites.

* * * * *